Dec. 16, 1941. W. D. PETERSON 2,266,441
PHOTOGRAPHIC FILTER AND COLORED IMAGE
Filed Sept. 29, 1939
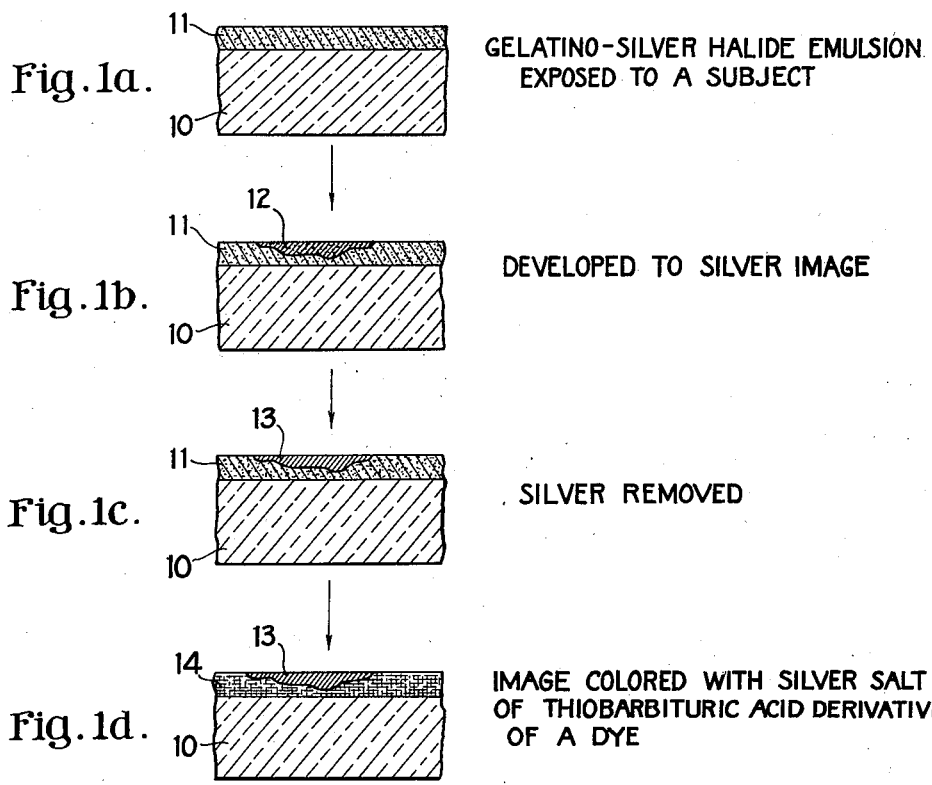
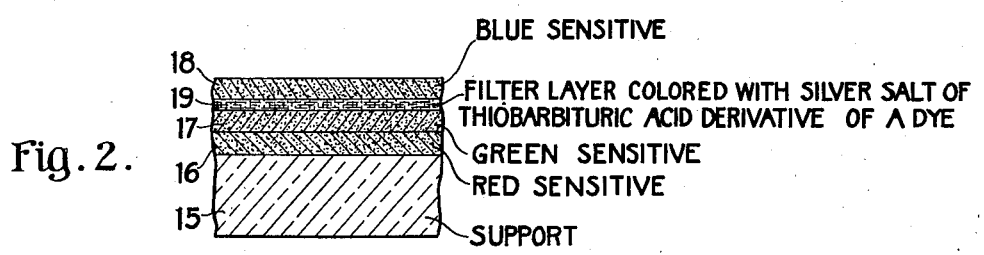
Inventor
Willard D. Peterson
By Newton M. (signature)
R. Frank Smith
Attorneys Patented Dec. 16, 1941

2,266,441

UNITED STATES PATENT OFFICE 2,266,441

PHOTOGRAPHIC FILTER AND COLORED IMAGE

Willard D. Peterson, Rochester, N. Y., assignor to Eastman Kodak Company, Rochester, N. Y., a corporation of New Jersey Application September 29, 1939, Serial No. 297,154
In Great Britain October 26, 1938

9 Claims. (Cl. 95—88)

This invention relates to photographic materials and particularly to a method of forming photographic filters and colored photographic images.

In the production of photographic films containing filter layers such as multi-layer films in which a filter layer is included for the purpose of preventing the action of light of certain colors on less than all of the layers of the film, it is desirable that the coloring material of the filter be removable during some stage of the processing. For example, in a film having three emulsion layers, each sensitive to a different spectral region, it is customary to coat a blue-sensitive layer outermost and to incorporate a yellow filter dye in or beneath this layer in order to prevent the action of blue light on the lower layers of the film. It is desirable for this filter layer to be removable in the customary processing baths such as the developing and fixing baths normally used. Many materials have been suggested for use in filter layers but they have been objectionable in most cases due to the difficulty of removal in the customary photographic baths. Dyes which are stable in the gelatin layer are frequently not dischargable in hypo solutions.

A further disadvantage of many of the filter dyes disclosed in the prior art is that they diffuse in gelatin and therefore wander from the layer in which they are incorporated. This is also true of many dyes used to color photographic images and in the case of either image dyes or filter dyes it is an especially objectionable characteristic where two or more layers are superposed on a photographic support. In this case the dyes wander and are therefore unable to perform their intended purpose of color separation. Numerous materials have been suggested for overcoming this objectionable feature of photographic dyes but with many of these, although the dyes are rendered non-diffusing, it is difficult or impossible to remove them from the photographic element. Where dyes are used as filters during exposure, it is essential that they be removed during processing of the film.

It is, therefore, an object of the present invention to provide a means for coloring a filter layer of a photographic film in a manner so that the dye does not wander from its intended layer; but can be readily removed at a certain stage during processing. A further object is to provide a coloring material which is removed in ordinary photographic processing baths. A still further object is to provide a novel means of producing a colored filter layer. A still further object is to provide a means for toning or coloring a photographic image.

These objects are accomplished by the present invention by the use of a thiobarbituric acid derivative of a colored material, the thiobarbituric acid being capable of forming an insoluble silver salt which is removable in a silver solvent, such as sodium thiosulfate or sodium cyanide solutions.

The invention comprises in its broader aspects the use of a thiobarbituric acid derivative of the following composition:

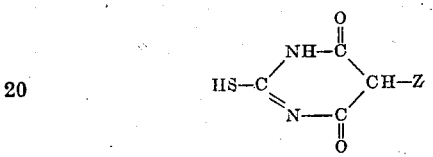

or

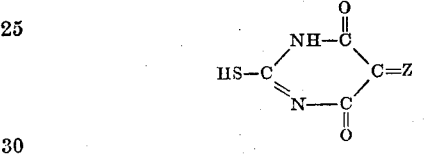

in which Z is an aryl or heterocyclic group and in which compound there is a chromophore or auxochromic group and also a carboxylic acid, sulfonic acid, hydroxyl or imino group capable of forming a soluble sodium salt. One of the active hydrogen atoms of the thiobarbituric acid portion of the molecule is replaceable by silver to form a colored silver salt which is removable from the photographic layer in hypo or cyanide solution. The solubilizing group in the molecule, that is the carboxyl, sulfonic, hydroxyl or imino group, aids in dissolving the silver salt in one of these solutions or in the solution used to dissolve the compound originally before conversion to silver salt. The colored silver salt of the thiobarbituric acid can be formed by treating a photographic layer containing a silver halide image with the thiobarbituric acid derivative or by mixing with the thiobarbituric acid derivative in the presence of gelatin, a silver salt in which the silver atom replaces a hydrogen atom of the thiobarbituric acid.

In the accompanying drawing, Figs. 1a to 1d are sectional views of a film showing stages in the formation of a colored image and Fig. 2 is a sectional view of a film showing a filter layer formed from the silver salt of the thiobarbituric acid derivative.

Compounds suitable for use in forming colored photographic images or colored filter layers according to my invention are the following which form yellow or orange silver salts:

(1) p-Sulfo-phenylazothiobarbituric acid

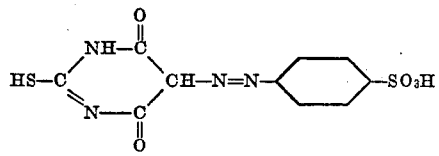

(2) o-Carboxyphenylazothiobarbituric acid

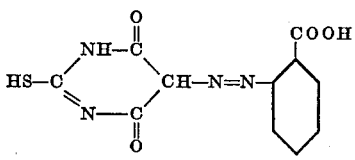

(3) 3-carboxy-4-hydroxyphenylazothiobarbituric acid

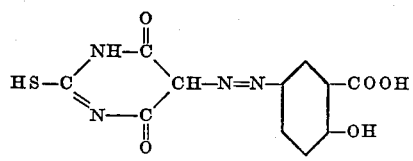

(4) p-Phenoxyacetic-azo thiobarbituric acid

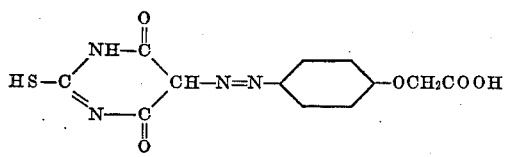

(5) m-Hydroxyphenylazothiobarbituric acid

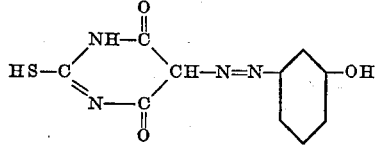

(6) m-Hydroxymethylphenylazo thiobarbituric acid

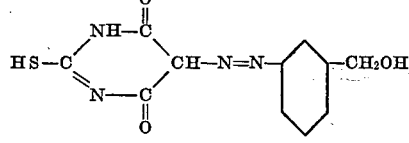

(7) p-Hydroxybenzal-thiobarbituric acid

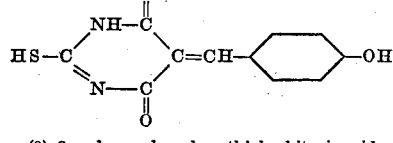

(8) 3-carboxy-phenylazo thiobarbituric acid

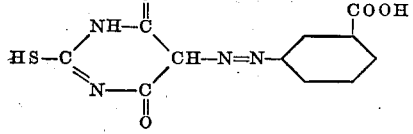

Compounds 1–4 are preferably used as filter dyes, since they are removable in the processing baths, while Compounds 5–8 are more stable, and are suitable for image dyes.

This list of compounds suitable for use in my invention is not exhaustive but merely indicates compounds which may be used.

The following specific examples, which are illustrative only, indicate methods of forming colored filter layers or colored photographic images according to my invention.

*Example 1*

A photographic filter layer is formed by mixing the following ingredients to form a colored gelatin solution:

| | Grams |
|---|---|
| 3-carboxy-4-hydroxy phenylazothiobarbituric acid | 3 |
| Silver nitrate | 1.75 |
| Sodium carbonate | 10 |
| Gelatin (7% solution) | 100 |

The silver of the silver nitrate displaces a hydrogen of the thiobarbituric acid to form an insoluble yellow silver salt dye in the gelatin solution. The solution may then be coated on a photographic film in the customary manner to serve as a filter layer for blue light. The dye, as its silver salt is non-diffusing.

*Example 2*

A colored photographic image may be formed in the following manner. A gelatino-silver halide emulsion is exposed to a subject and developed in the usual way to form a metallic silver negative image. The metallic silver is removed by means of a suitable solvent such as an acid permanganate solution and the positive portions of the layer then contain silver halide. The film is immersed for a few minutes in a 1–3% solution of 3-carboxy phenylazothiobarbituric acid containing 2% sodium carbonate. This forms a brilliant yellow image. It is not necessary to expose the layer after removal of the metallic silver and the process may be carried out in daylight after the first negative development.

The colored silver image made according to my invention may be formed from any silver salt which is more soluble than the colored silver salt formed by replacement of the active hydrogen of the thiobarbituric acid. This includes such salts as silver chloride, silver bromide, silver nitrate, silver ferricyanide, silver o-phosphate, silver arsenate, silver oxalate, silver cyanate and silver citrate.

My invention will now be described by reference to the accompanying drawing. As shown in Fig. 1, the support 10 carries a gelatin silver halide emulsion layer 11 which is exposed to a subject or to a negative image in the customary manner. This film is illustrated in Fig. 1a. It is to be understood that the film may contain subbing layers, overcoating layers and anti-halation layers which are not shown. The anti-halation layers may be prepared from these silver salt dyes.

After exposure, the film 10 is developed to form a metallic silver image 12 as shown in Fig. 1b and the silver is removed in a silver solvent which does not affect the remaining silver halide (such as a weak sulfuric acid-permanganate solution) to leave a clean portion 13 as shown in in Fig. 1c and unexposed silver halide in the remaining portions of the layer. The film is then immersed in a dilute sodium carbonate solution of a thiobarbituric acid derivative of a dye whereupon a deposition of the silver salt of the dye occurs in the portion 14 as shown in Fig. 1d.

Fig. 2 shows a multi-layer photographic film comprising a support 15 on which are coated emulsion layers 16, 17 and 18 sensitive respectively to the red, green and blue regions of the spectrum. These layers are used for the formation of dyes not soluble in silver solvents, such as azomethine or indophenol dyes. Since the emulsion layers 16 and 17 are also sensitive to blue light, a yellow filter 19 is coated between emulsion layer 17 and emulsion layer 18. This filter layer is formed by mixing a silver salt with a thiobarbituric acid derivative of a dye to form a silver salt of the thiobarbituric acid derivative according to my invention. This is formed in gelatin solution and the colored gelatin produced in this way is coated during manufacture of the film. The coloring material of this layer is removable in one of the usual fixing solutions such as cyanide or hypo.

It is to be understood that my process is not limited to the examples and modifications described in the foregoing specification. Images of other types, for example sound images, may be formed from silver salts of thiobarbituric acid derivatives according to my invention. The process of forming colored images in this way has many advantages. The silver salt used in the reaction with the thiobarbituric acid derivative need not be light-sensitive and the transformation into a colored insoluble salt is ionic and may be very rapid. It is not necessary to control closely the hydrogen ion concentration and the process is not dependent upon a complex set of conditions involving the rate of diffusability of a developer and dye intermediate into the photographic layer. It eliminates the necessity of stabilizing the solutions against aerial oxidation and makes use of a reaction which can readily be controlled. A wide choice of dyes and colors are available. A further advantage is that the intensity of the final picture may be reduced by bathing for a short time in a solution of alkaline hypo, or in some cases, in a dilute solution of ammonium hydroxide.

The specific examples included in the present specification are illustrative only and it is to be understood that my invention is to be taken as limited only by the scope of the appended claims.

I claim:

1. The method of forming a non-diffusing color in a colloidal photographic material containing a silver salt, which comprises treating the material with a solution of a thiobarbituric acid containing a substituent group selected from the class consisting of aryl and heterocyclic groups, which compound contains at least one chromophoric group and at least one radical selected from the class consisting of carboxylic acid, sulfonic acid, hydroxyl and imino groups, the active hydrogen of the thiobarbituric acid being replaceable by silver to form a colored silver salt, the original silver salt in the material being more soluble than the silver salt formed by the replacement.

2. The method of forming a non-diffusing color in a colloidal photographic material containing a silver salt, which comprises treating the material with a solution of a thiobarbituric acid derivative having a general formula selected from the class consisting of

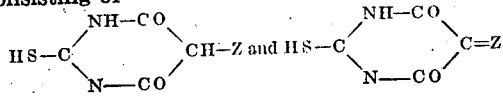

where Z is selected from the class consisting of aryl and heterocyclic nuclei, and the compound contains at least one chromophoric group, at least one group capable of forming a water soluble salt, selected from the class consisting of a carboxylic acid, sulfonic acid, hydroxyl and imino groups, the active hydrogen of the thiobarbituric acid being replaceable by silver to form a colored silver salt, the original silver salt in the material being more soluble than the silver salt formed by the replacement.

3. The method of forming a colored image in a photographic gelatin layer containing a silver salt image, which comprises treating the layer with a solution of a thiobarbituric acid containing a substituent group selected from the class consisting of aryl and heterocyclic groups the compound containing a chromophoric group and a radical selected from the class consisting of carboxylic acid, sulfonic acid hydroxyl and imino groups, the active hydrogen of the thiobarbituric acid being replaceable by silver to form a colored silver salt, and the original silver salt in the material being more soluble than the silver salt formed by the replacement, and thereby forming a silver salt of the thiobarbituric acid compound.

4. The method of forming a photographic filter which comprises mixing a silver salt in the presence of gelatin with a thiobarbituric acid containing a substituent group selected from the class consisting of aryl and heterocyclic groups, the compound containing a chromophoric group and a radical selected from the class consisting of carboxylic acid, sulfonic acid, hydroxyl and imino groups, the active hydrogen of the thiobarbituric acid being replaceable by silver to form a colored silver salt, the original silver salt being more soluble than the silver salt formed by the replacement, and then coating the gelatin solution containing the colored silver salt on a support.

5. A photographic filter layer, the color of which is removable in sodium thiosulfate solutions, comprising a gelatin layer containing a silver salt of a thiobarbituric acid derivative of a colored compound containing a solubilizing group selected from the class consisting of carboxylic acid, sulfonic acid, hydroxyl and imino groups.

6. A photographic filter layer the color of which is dischargeable in sodium thiosulfate solutions comprising a gelatin layer containing a thiobarbituric acid derivative of the following formula:

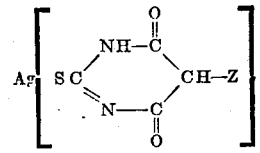

in which Z is selected from the class consisting of aryl and heterocyclic nuclei, and the compound contains at least one chromophoric group and also a solubilizing group selected from the class consisting of carboxylic acid, sulfonic acid, hydroxyl and imino groups.

7. A photographic filter layer the color of which is dischargeable in sodium thiosulfate solutions, comprising a gelatin layer containing uniformly dispersed therein the silver salt of o-carboxy-phenylazothiobarbituric acid.

8. A photographic filter layer, the color of which is dischargeable in sodium thiosulfate solutions, comprising a gelatin layer containing a colored compound of the following formula:

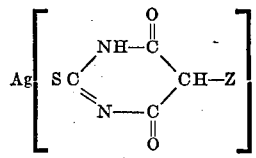

in which Z is selected from the class consisting of aryl and heterocyclic groups containing a chromophoric group and a solubilizing group selected from the class consisting of carboxylic acid, sulfonic acid, hydroxyl and imino groups.

9. A photographic filter layer the color of which is dischargeable in sodium thiosulfate solutions comprising a gelatin layer containing a thiobarbituric acid derivative of the following formula:

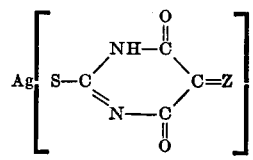

in which Z is selected from the class consisting of aryl and heterocyclic groups and the compound contains a chromophoric group and a solubilizing group selected from the class consisting of carboxylic acid, sulfonic acid, hydroxyl and imino groups.

WILLARD D. PETERSON.